(12) United States Patent
Wickeraad

(10) Patent No.: US 6,651,180 B1
(45) Date of Patent: Nov. 18, 2003

(54) METHOD AND APPARATUS FOR GENERATING TIMEOUTS TO A SYSTEM BASED COUNTING INTERVALS SUPPLIED BY A SHARED COUNTING DEVICE

(75) Inventor: John A. Wickeraad, Granite Bay, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 0 days.

(21) Appl. No.: 09/560,551

(22) Filed: Apr. 28, 2000

(51) Int. Cl.[7] .............................................. G06F 1/04
(52) U.S. Cl. ........................................................ 713/502
(58) Field of Search ........................ 713/500; 710/260, 710/264; 368/89, 107, 108

(56) References Cited

U.S. PATENT DOCUMENTS

| | | | | | |
|---|---|---|---|---|---|
| 3,891,973 | A | * | 6/1975 | Maxwell | 368/107 |
| 4,091,423 | A | * | 5/1978 | Branscome | 380/244 |
| 4,091,447 | A | * | 5/1978 | Dillon et al. | 710/264 |
| 4,748,573 | A | * | 5/1988 | Sarandrea et al. | 702/108 |
| 4,805,137 | A | * | 2/1989 | Grant et al. | 710/107 |
| 5,274,763 | A | * | 12/1993 | Banks | 710/316 |
| 5,386,517 | A | * | 1/1995 | Sheth et al. | 710/60 |
| 5,542,113 | A | * | 7/1996 | Fink et al. | 455/119 |
| 6,085,343 | A | * | 7/2000 | Krishnamoorthy | 714/724 |
| 6,237,146 | B1 | * | 5/2001 | Richards et al. | 725/100 |
| 6,442,571 | B1 | * | 8/2002 | Haff et al. | 707/201 |
| 6,493,106 | B1 | * | 12/2002 | Gauthier et al. | 358/1.15 |

OTHER PUBLICATIONS

Morris, Tim; AppleTalk timeout values—what should i use?; Oct. 3, 1993.*

* cited by examiner

Primary Examiner—Thomas Lee
Assistant Examiner—Mark Connolly
(74) Attorney, Agent, or Firm—Clare T. Hartnett

(57) ABSTRACT

A timeout mechanism that can accommodate an improved accuracy in determining the timeout of a pending transaction while conserving the amount of processing circuitry is herein disclosed. A fetch state machine is associated with each cache line. When the cache line is fetched from memory, the fetch state machine tracks the number of timeout periods that lapse before the cache line is retrieved. If a predetermined number of timeout periods lapses before the cache line is retrieved, a timeout occurs and processed accordingly.

17 Claims, 4 Drawing Sheets

US 6,651,180 B1

METHOD AND APPARATUS FOR GENERATING TIMEOUTS TO A SYSTEM BASED COUNTING INTERVALS SUPPLIED BY A SHARED COUNTING DEVICE

FIELD OF THE INVENTION

The present invention relates generally to computer systems. More particularly, the invention relates to a mechanism for reducing timeout uncertainty associated with pending transactions.

BACKGROUND OF THE INVENTION

It is common for devices coupled in a computer system to communicate by exchanging transactions or requests. For example, an I/O device can initiate a transaction requesting data from a host I/O bridge. The host I/O bridge, in turn, can initiate a DMA transaction requesting the data from main memory. While the host I/O bridge is waiting for the requested data, the host I/O bridge can perform other tasks including initiating other DMA transactions. In order to prevent the host I/O bridge from waiting indefinitely for the requested data, a timeout mechanism is often used to indicate that an error has occurred when a response is not received within the timeout period. The host I/O bridge then handles the error according to the type of timeout.

One such timeout mechanism is a timeout counter. A timeout counter tracks the number of timeout periods that have lapsed since the transaction was initiated. The timeout counter consists of a number of bits, n, and can track $2^n$ timeout periods. When the timeout counter reaches a predetermined threshold, an interrupt is set indicating that a timeout has occurred.

The number and length of the timeout periods is usually set based on the maximum expected response time for the transaction. In some applications, it is necessary for the timeout counter to indicate with reasonably accuracy the time at which the timeout occurs. However, this requirement is not always feasible.

In some applications, a single timeout counter is used to accommodate multiple transactions. Although this technique utilizes less circuitry, it does not accurately track the time at which the timeout occurs. The transactions are queued and the timeout starts once the transaction gets to the head of the queue. The time that the transaction waits in the queue is not tracked which affects the accuracy of the timeout.

In yet other applications, there is a timeout counter for each transaction. Although this produces a more accurate result, it has the drawback of requiring a considerable amount of circuitry. For example, for an application having 128 possible outstanding transactions where each timeout counter has 20 bits, there would have to be 2560 bits of counters. At times, this amount of circuitry is not feasible. Accordingly, there is a need to overcome these shortcomings.

SUMMARY OF THE INVENTION

In summary, the technology of the present invention pertains to a timeout mechanism that attempts to accurately track the time a timeout occurs while preserving the amount of circuitry and processing required to maintain this accuracy. In an embodiment of the present invention, the timeout mechanism is used to track requests for cache lines that are requested from an I/O bridge in a multiprocessor system.

The timeout mechanism includes a timeout control unit having a fetch state machine for each cache line entry. Each fetch state machine ensures that the outstanding fetch transaction for the associated cache line times out after a prescribed number of timeout periods have lapsed. Preferably, there are six timeout periods. The timeout periods are set at a relatively small interval so that when the timeout occurs, the timeout will have occurred within a smaller time frame which produces a more accurate result. If the fetch transaction times out, an error control unit is notified which handles the timeout appropriately.

Such accuracy is important in a system, such as the computer system described herein, which has a hierarchy of timeouts. The lowest priority timeouts have a shorter timeout period with the higher priority timeouts having a longer timeout period. Each succeeding level in the hierarchy has a longer timeout period than a preceeding priority level. The priority level scheme is set so that the lower priority devices shut down before the higher priority devices in the event of a system failure. If a lower priority component's timeouts are longer than expected, it can affect the shutdown order.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
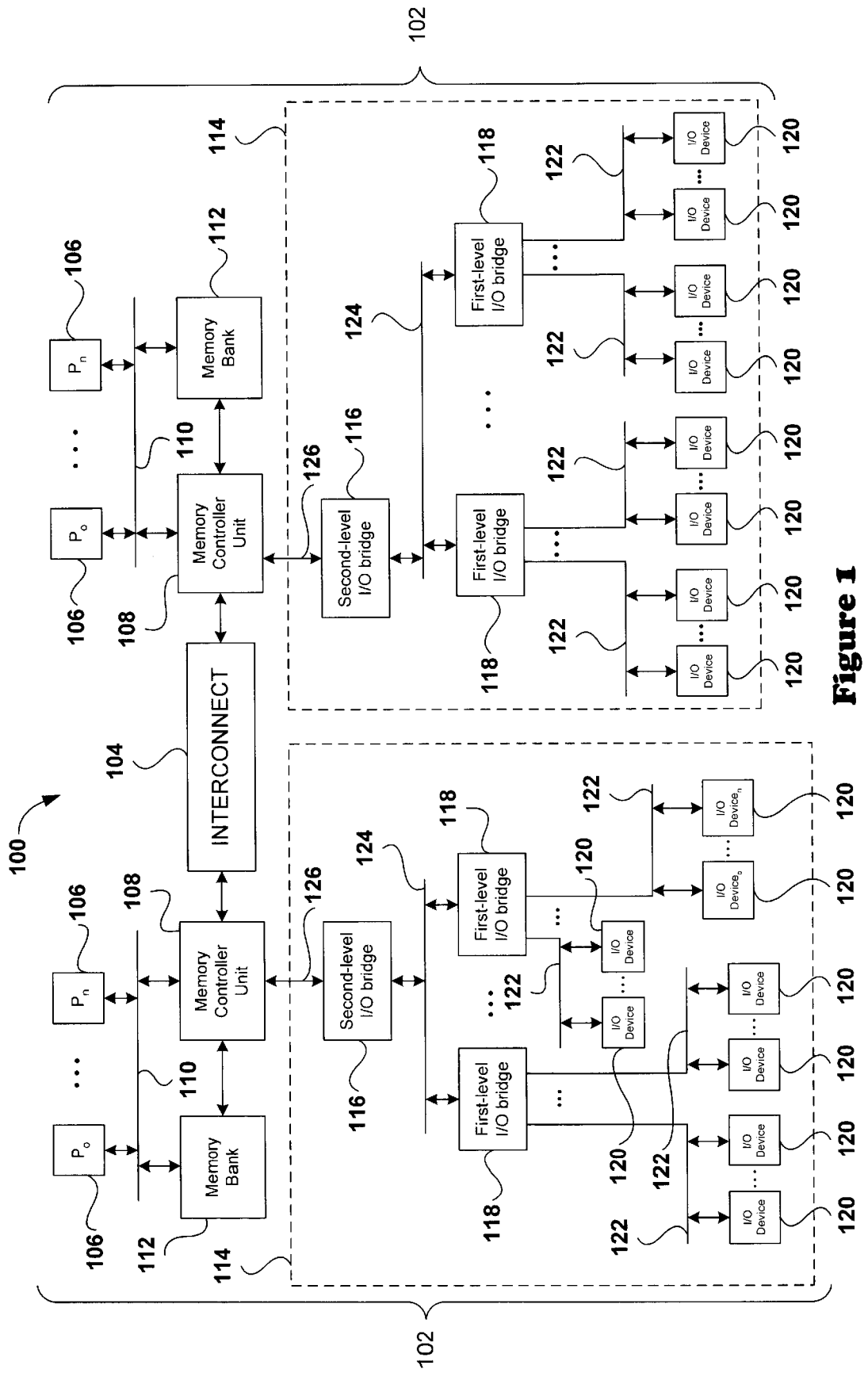
FIG. 1 is a schematic view of an exemplary computer system in accordance with an embodiment of the present invention.

FIG. 1 illustrates an exemplary computer system 100 embodying the technology of the present invention. There is shown a number of cells 102 connected through an interconnect 104. Each cell 102 can include a number of processors (e.g., $P_0$–$P_n$) 106 connected to a memory controller unit 108 by a first communication link 110, such as a bus. The memory controller unit 108 is also connected to a memory bank 112 and an I/O subsystem 114.

The processors 106 can be any type of processor or central processing unit ("CPU"), such as but not limited to, microprocessors and the like. Examples of such microprocessors include the Hewlett-Packard ("HP") PA-RISC family of microprocessors, the Intel IA-32 and IA-64 microprocessors, and the like. Each processor 106 has several levels of internal caches (not shown) that store a portion of the system memory that can be accessible by other processors 106 in the cell 102 and by other cells 102.

The memory controller unit 108 controls access to the system memory. The memory banks 112 can be composed of any type of memory device or combination thereof, such as DRAM, SRAM, RAM, flash memory, and the like.

Each cell 102 includes a portion of the system memory image and the requisite components that maintain the system memory in a coherent manner. The system memory image of the multiprocessor computer system 100 is distributed throughout each cell 102 and can be partitioned to be accessible within each cell 102 and by other cells 102. For example, the system memory can include interleaved memory which is memory that is interleaved across cells 102 or non-interleaved memory which is memory that is accessible within a cell 102.

A directory-based coherency protocol is used to maintain the system memory in a coherent manner. In the directory-based coherency protocol, each memory line has an associated tag that includes state information identifying the owner or sharers of that memory line. The state information provides a means to coherently track the memory lines shared within the multiprocessor system 100.

The interconnect 104 can be any type of high-speed communication link, such as but not limited to, a network, point-to-point link, crossbar switch, or the like. Preferably, a crossbar switch is used.

The I/O subsystem 114 can include a second-level I/O bridge 116, a number of first-level I/O bridges 118, and several I/O devices 120. The I/O devices 120 are connected to a first-level I/O bridge 118 through a bus 122, such as the Peripheral Component Interface ("PCI") bus. The I/O devices 120 include devices such as but not limited to host bus adapters, bus bridges, graphics adapter, printers, audio peripherals, motion video peripherals, and the like.

The first-level bridge 118 is connected through a second communications link 124 to the second-level I/O bridge 116. The second-level I/O bridge 116 is coupled to the memory controller unit 108 through a high-speed interconnect 126. The first-level 118 and second-level I/O bridges 116 serve to connect multiple PCI buses 120 operating at a slower clock rate with the high-speed interconnect 126 in a manner that reduces the pinout of the bridges 116, 118.

The foregoing description has described an exemplary computer system 100 embodying the technology of the present invention. Attention now turns to a more detailed discussion of the second-level I/O bridge 116.

Figure 2:
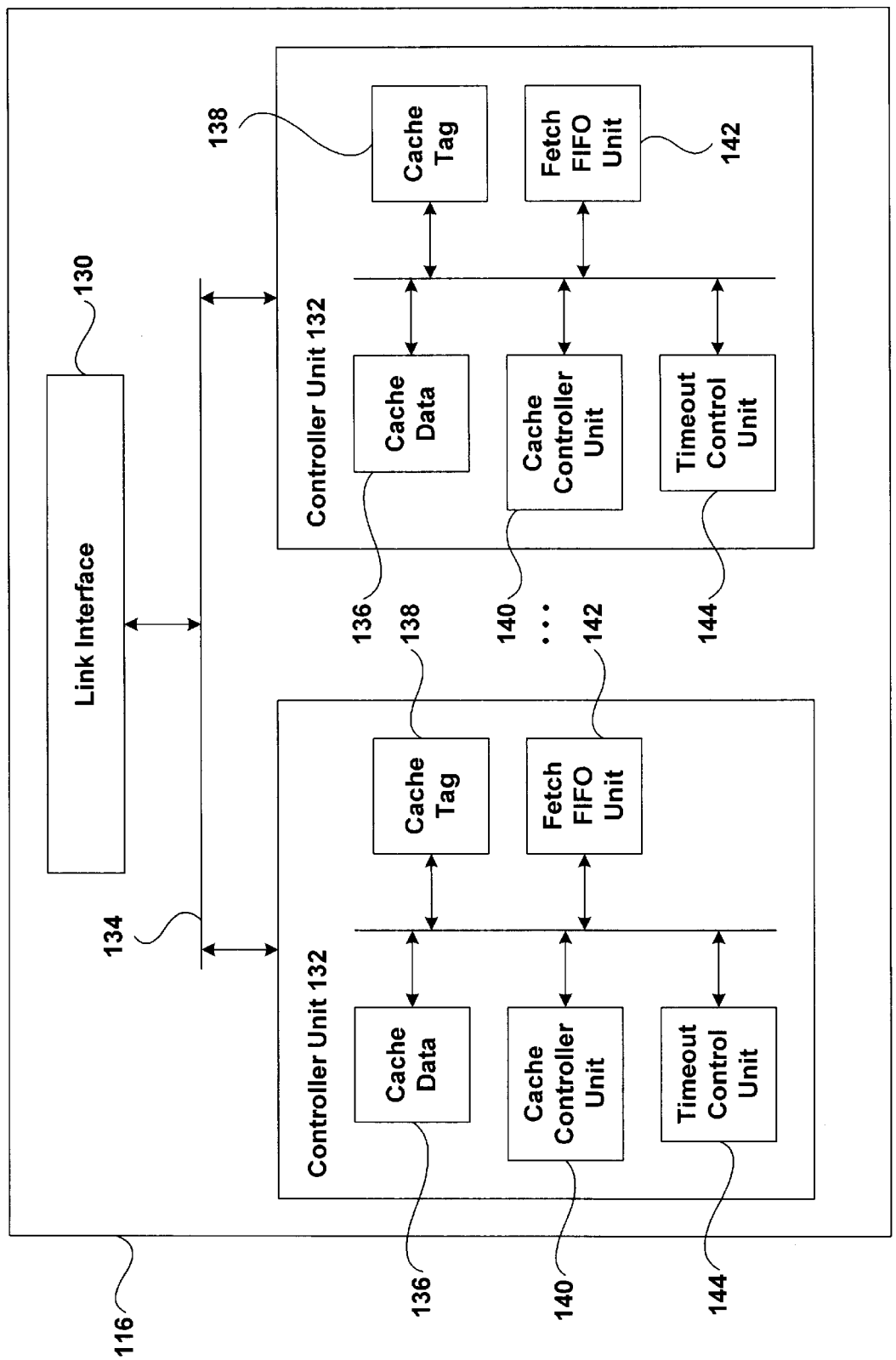
FIG. 2 is a block diagram illustrating the second level I/O bridge shown in FIG. 1.

FIG. 2 illustrates the components of the second-level I/O bridge 116. There is shown a link interface 130 and a number of control units 132 connected through a communications link 134. The link interface 130 enables the second-level I/O bridge 116 to communicate through the high-speed interconnect 126. Each control unit 132 processes transactions received from the I/O devices 120 connected to the respective first-level I/O bridges 118 supported by the control unit 132.

Each control unit 132 includes a cache having a cache data unit 136 and a cache tag unit 138. Each entry into the cache data unit 136 stores a cache line of data that is preferably 64-bytes wide. Preferably, there are 64 cache line entries. Each tag line entry in the cache tag unit 138 is associated with a particular cache line and stores tag data including state information. In addition, there is a cache controller unit 140 that manages the cache. The cache controller unit 140 handles DMA read and write requests, prefetches cache lines, processes software flush requests, and the like.

A fetch FIFO unit 142 is provided to fetch cache lines from the main memory which are then stored in the cache data unit 136 and to flush data from the cache data unit 136. The fetch FIFO unit 142 coordinates this activity with the cache controller unit 140 and the timeout control unit 144. The fetch FIFO unit 142 uses a cache entry address ("CEA") 148 and a load signal 146 to fetch a cache line (see FIG. 3). When the cache line is returned, a response signal 150 and the CEA 148 is returned to the fetch FIFO unit 142 as well.

Figure 3:
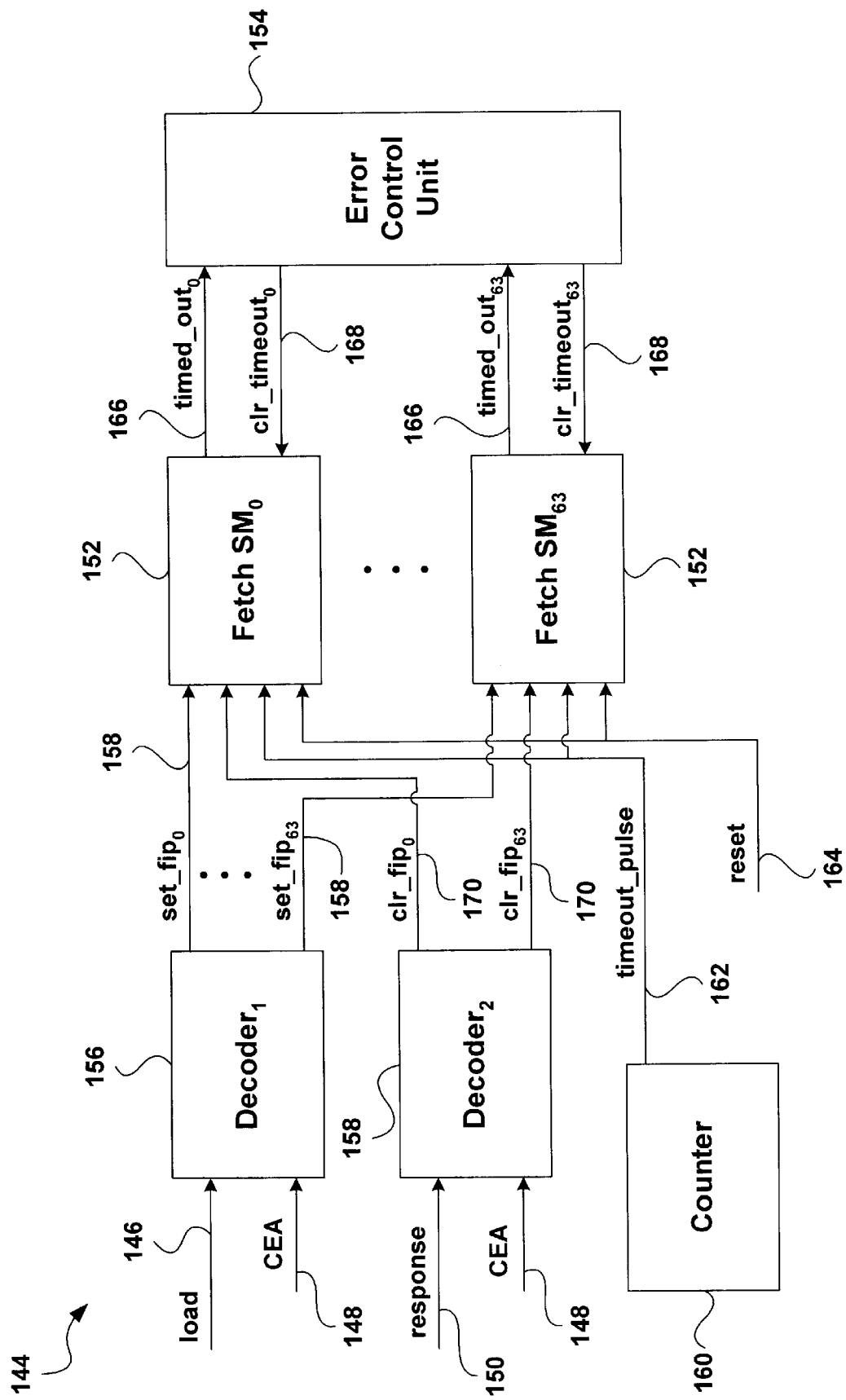
FIG. 3 is a block diagram illustrating the timeout control unit shown in FIG. 2.

Referring to FIG. 3, the timeout control unit 144 is provided to ensure that transactions requesting a cache line do not wait indefinitely. In brief, the timeout control unit 144 has a fetch state machine 152 for each cache line entry. Each fetch state machine 152 ensures that the outstanding fetch transaction for the associated cache line times out after a prescribed number of timeout periods have lapsed. If the fetch transaction times out, an error control unit 154 is notified which handles the timeout appropriately. Attention now turns to a more detailed description of the timeout control unit 144.

As shown in FIG. 3, there is shown sixty-four fetch state machines ("SM") 152, each of which is associated with a particular cache line entry. For example, fetch state machine 3 is associated with cache line entry 3. A first decoder 156 is coupled to each of the fetch state machines 152 and is used to indicate which cache line is being fetched. The first decoder 156 receives the load 146 and CEA 148 signals that are used by the fetch FIFO unit 142 when it fetches a particular cache line from main memory. The first decoder 156 sets one of the sixty-four output signals, set_fip[0 . . . 63], based on the load 146 and CEA 148 signals. The set_fip signal 158 that is set by the first decoder indicates the particular cache line that has a fetch in progress. The set_fip signal 158 that is set is transmitted to its respective fetch state machine 152 where it is used to initiate the timeout process.

A second decoder 158 is also coupled to each of the fetch state machines 152. The second decoder 158 receives the response 150 and CEA 148 signals that are received by the fetch FIFO unit 142 in response to a fetch request. If the fetched cache line was returned (i.e., response='1'b), the second decoder 158 sets the appropriate clr_fip [0 . . . 63] signal 170 thereby indicating that the associated cache line was retrieved.

A counter 160 is used to generate pulses at a predetermined time. The counter 160 generates a pulse, timeout_pulse, 162 within every n clock cycles. The timeout_pulse 162 is transmitted to each fetch state machine 152.

In addition, a reset signal 164 is transmitted to each of the fetch state machines 152 which can be set at system initialization, or the like, by one of the processors 106 or by another control unit. The reset signal 164 initializes the fetch state machine 152.

Each of the fetch state machines 152 has a time_out signal 166 that is transmitted to the error control unit 154. The time_out signal 166 indicates that a time out has occurred which will be explained in more detail below. The error control unit 154 handles the time out conditions appropriately. For instance, the error control unit 154 can generate an interrupt that is sent to one of the processors 106 or the operating system can poll the error control unit 154 for the time outs. When the error control unit 154 determines that another fetch for the timed-out cache line is possible, the error control unit 154 sets a clr_timeout signal 168 back to the affected fetch state machine 152 which resumes the fetch state machine's processing.

Attention now turns to the operation of the fetch state machine 152. In brief, the fetch state machine 152 attempts to accurately track the time a timeout occurs while preserving the amount of circuitry required to maintain this accuracy. In this instance, there are six timeout periods. When the sixth timeout period lapses, the fetch state machine 152 will have timed out. The aggregation of the six timeout periods is set based on the maximum expected response time that a memory fetch should take to complete. The timeout periods are set at a relatively small interval so that when the timeout occurs, it can be determined with reasonable accuracy that the timeout occurred within a smaller time frame. For instance, if the maximum expected response time for a memory fetch is 100 us and each timeout period is set to 20 us, and there are six timeout periods, then when the transaction times out, it can be determined that the timeout occurred between 100–120 us. By comparison, for the same maximum expected response time, if there are only two timeout periods, each of which are set to 100 us, then when the transaction times out, the timeout will be determined to have occurred some time between 100–200 us.

Such accuracy is important in a system, such as the computer system 100 described herein, which has a hierarchy of timeouts. The lowest priority timeouts have a shorter timeout period with the higher priority timeouts having a longer timeout period. Each succeeding level in the hierarchy has a longer timeout period than the preceeding priority level. If a lower priority component timeouts longer than expected, it can affect the priority scheme.

For instance, a peripheral device 120 can have a lower priority timeout associated with it while a processor 106 is associated with a higher priority timeout. This prioritization is done so that in the event of a catastrophic failure the peripheral device 120 will shut down and not the processor 106. When the peripheral device 120 shuts down, the interface will generate error responses on its behalf. These messages will be sent to the processor 106 even though the processor 106 was expecting a non-error type of message. However, the error message will allow the processor to continue to operate and not time out. Attention now turns to the operation of the fetch state machine 152.

Figure 4:
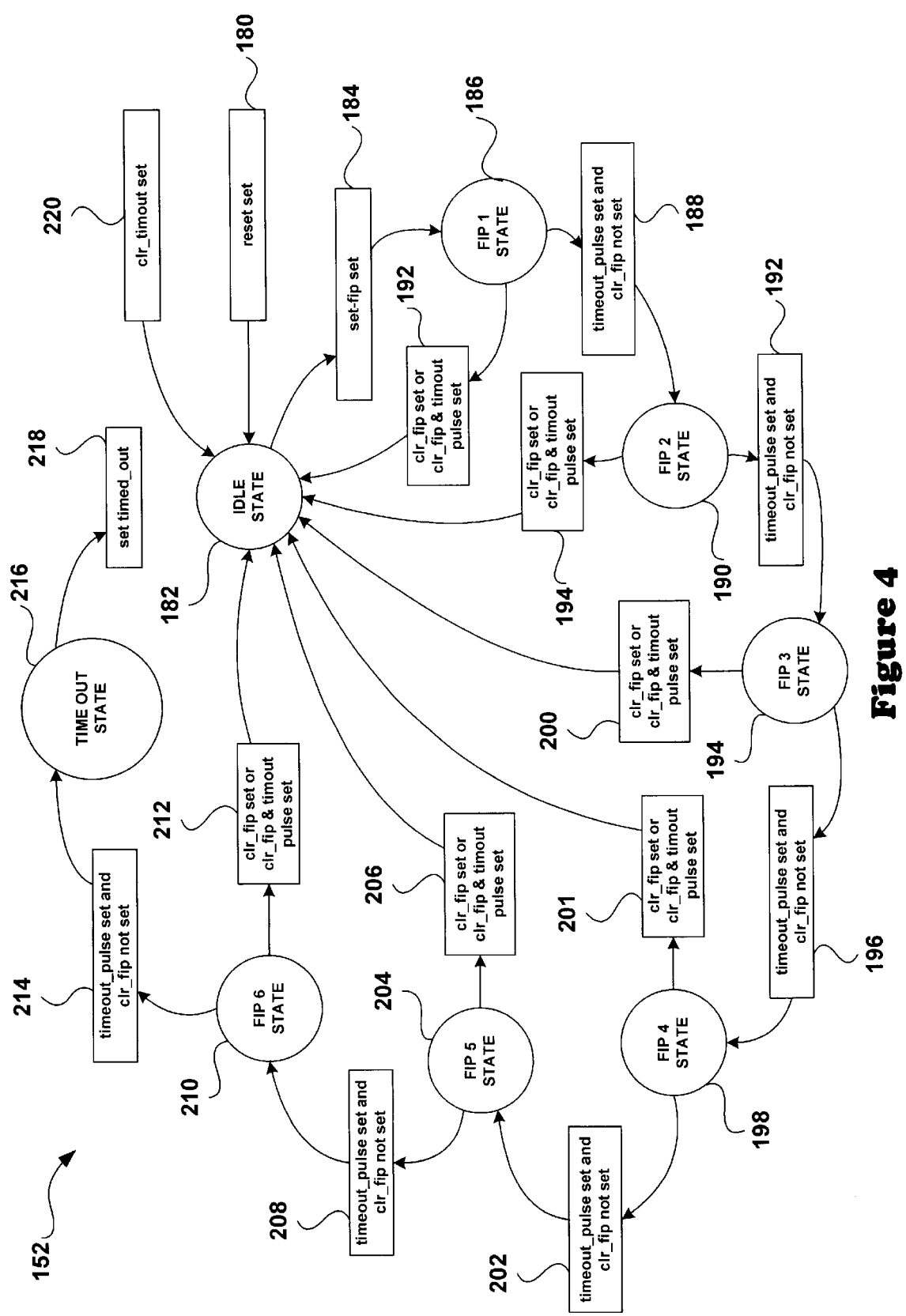
FIG. 4 is a block diagram illustrating the steps used by the fetch state machines in accordance with an embodiment of the present invention.

Referring to FIG. 4, upon system initialization or boot up, a reset signal 164 is set (step 180) and transmitted to the fetch state machine 152 which places the fetch state machine 152 in the idle state (step 182). When the set_fip signal 158 is set (step 184), then a fetch is progress has been initiated by the fetch FIFO unit 142 for the cacheline entry associated with the fetch state machine 152 and the fetch state machine 152 enters into the first Fetch-In-Progress ("FIP") state (step 186). If a timeout_pulse 162 is set and the clr_fip is not set when the fetch state machine 152 is in the first FIP state (step 186), then the fetch state machine 152 progresses to the second FIP state (step 190). If the clr_fip signal 170 is set or the clr_fip signal 170 and the timeout_pulse 162 are both set simultaneously (step 192), then the fetch state machine 152 resorts back to the idle state (step 182).

When the fetch state machine 152 is in the second FIP state (step 190) and the timeout_pulse 162 is set and the clr_fip is not set (step 192), the fetch state machine 152 progresses to the third FIP state (step 194). If the clr_fip signal 170 is set or the clr_fip signal 170 and the timeout_ pulse 162 are both set simultaneously (step 194), then the fetch state machine 152 resorts back to the idle state (step 182).

When the fetch state machine 152 is in the third FIP state (step 194) and the timeout_pulse 162 is set and the clr_fip is not set (step 196), the fetch state machine 152 progresses to the fourth FIP state (step 198). If the clr_fip signal 170 is set or the clr_fip signal 170 and the timeout_pulse 162 are both set simultaneously (step 200), then the fetch state machine 152 resorts back to the idle state (step 182).

When the fetch state machine 152 is in the fourth FIP state (step 198) and the timeout_pulse 162 is set and the clr_fip is not set (step 202), the fetch state machine 152 progresses to the fifth FIP state (step 204). If the clr_fip signal 170 is set or the clr_fip signal 170 and the timeout_pulse 162 are both set simultaneously (step 201), then the fetch state machine 152 resorts back to the idle state (step 182).

When the fetch state machine 152 is in the fifth FIP state (step 204) and the timeout_pulse 162 is set and the clr_fip is not set (step 208), the fetch state machine 152 progresses to the sixth FIP state (step 210). If the clr_fip signal 170 is set or the clr_fip signal 170 and the timeout_pulse 162 are both set simultaneously (step 206), then the fetch state machine 152 resorts back to the idle state (step 182).

When the fetch state machine 152 is in the sixth FIP state (step 210) and the timeout_pulse 162 is set and the clr_fip is not set (step 214), the fetch state machine 152 progresses to the time out state (step 216). In the time out state, the fetch state machine 152 sets the timed_out signal 166 that is transmitted to the error control unit 154 for further processing (step 218). If the clr_fip signal 170 is set or the clr_fip signal 170 and the timeout_pulse 162 are both set simultaneously (step 212), then the fetch state machine 152 resorts back to the idle state (step 182).

Once the timout condition is handled by the error control unit 154, the clr_timeout signal 168 is set (step 220) and the fetch state machine 152 resumes back to the idle state (step 182).

The foregoing description has described a timeout mechanism that can more accurately determine the timeout of a pending transaction while reducing the amount of circuitry and processing involved.

However, it should be noted that the number of FIP states used by the fetch state machines is not a limitation on the technology of the present invention. The fetch state machines can utilize more FIP states in order to achieve more accurate timeouts. Furthermore, the technology of the present invention is not limited to the use of state machines. One skilled in the art can use counters, combinatorial logic, or the like to implement the functionality of the fetch state machines.

The foregoing description, for purposes of explanation, used specific nomenclature to provide a thorough understanding of the invention. However, it will be apparent to one skilled in the art that the specific details are not required in order to practice the invention. In other instances, well known structures and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A computer system, comprising:
   a memory storage device having a plurality of transactions, each transaction receiving a response;
   a counter device that generates a pulse at a specified time interval; and
   a plurality of timeout devices, each timeout device coupled to the counter device, each timeout device corresponding to a select one of the transactions, each timeout device having:

an initiator mechanism that starts the timeout device when the corresponding transaction is initiated;

a tracking mechanism that maintains a count of a number of pulses received from the counter device;

a timeout mechanism that signifies a time out when the number of pulses meets a threshold and the threshold is satisfied before the response is received; and a reset mechanism that resets the tracking mechanism when the response is received before the threshold is satisfied.

2. A time-out control unit comprising:

an event-initiation input;

an event-outcome input;

a number of state machines, each state machine having a set input and a clear input, each state machine, following reception of a set signal from the set input, outputting a timeout signal after internally transitioning a number of internal states prior to reception of a clear signal from the clear input;

a first decoder that receives an event-initiation signal from the event-initiation input and, in response, sets a state machine; and a second decoder that receives an event-outcome signal from the event-outcome input and, in response, clears a state machine.

3. The time-out control unit of claim 2 wherein the event-initiation input comprises:

an event-initiation signal line; and a first address line.

4. The time-out control unit of claim 3 wherein, when the first decoder receives an event-initiation signal from the event-initiation signal line and an event-associated address from the first input address line, sets a signal line interconnecting the decoder with the set input of a state machine designated by the event-associated address.

5. The time-out control unit of claim 3 wherein, when the second decoder receives an event-outcome signal from the event-outcome signal line and an event-associated address from the second input address line, sets a signal line interconnecting the second decoder with the clear input of a state machine designated by the event-associated address.

6. The time-out control unit of claim 2 wherein the event-outcome input comprises:

an event-outcome signal line; and a second address line.

7. The time-out control unit of claim 2 wherein each state machine comprises:

the set input interconnected with the first decoder;

the clear input interconnected with second decoder;

a timeout-signal output;

a timeout-clear input;

a reset input;

an interval-pulse input; and a number of internal states, each transition by the state machine initiated by one of:

reception of a reset signal via the reset input;

reception of a timeout-clear signal via the timeout-clear input; and an interval pulse via the internal-pulse input.

8. The time-out control unit of claim 7 wherein, upon receiving a reset signal via the reset input or a timeout-clear signal via the timeout-clear input, the state machine transitions to an idle state.

9. The time-out control unit of claim 8 wherein, upon receiving an interval pulse via the internal-pulse input, when the state machine currently resides in a final intermediate state, the state machine transitions to a timeout state and outputs a timeout signal; and when the state machine currently resides in the idle state or an intermediate state other than the final intermediate state, the state machine transitions to a next intermediate state.

10. The time-out control unit of claim 2 further including an interval pulse generator, interconnected with the interval-pulse inputs of the number of state machines, that generates electrical pulses at regular intervals.

11. An I/O bridge including the time-out control unit of claim 2, wherein the I/O bridge, upon issuing a cache-line fetch operation, inputs to the event-initiation input of the time-out control unit an event initiation signal and, upon receiving a cache-line in response to a cache-line fetch operation, inputs to the event-outcome input of the time-out control unit an event-outcome signal.

12. A computer system including the I/O bridge of claim 11 to interconnect I/O devices to a memory controller unit.

13. A method for timing an operation, the method comprising:

providing a time-out control unit having
an event-initiation input,
an event-outcome input, and
a number of state machines, each state machine having a set input and a clear input, each state machine, following reception of a set signal from the set input, outputting a timeout signal after internally transitioning a number of internal states prior to reception of a clear signal from the clear input, a particular state machine set upon reception of an event-initiation signal by the time-out control unit;

upon launching the operation, inputting to the event-initiation input of the time-out control unit an event initiation signal;

when the operation completes, inputting to the event-outcome input of the time-out control unit an event outcome signal; and when a timeout signal is generated by a state machine, detecting the timeout signal as an operation-timed-out event.

14. The method of claim 13 wherein the event-initiation input includes an event-initiation signal line and a first address line, and wherein a first decoder receives an event-initiation signal from the event-initiation signal line and an event-associated address from the first input address line, sets a signal line interconnecting the decoder with the set input of a state machine designated by the event-associated address.

15. The method of claim 13 wherein the event-outcome input includes an event-outcome signal line and a second address line, and wherein a second decoder receives an event-outcome signal from the event-outcome signal line and an event-associated address from the second input address line, sets a signal line interconnecting the second decoder with the clear input of a state machine designated by the event-associated address.

16. The method of claim 13 wherein each state machine comprises:

the set input interconnected with the first decoder;

the clear input interconnected with second decoder;

a timeout-signal output;

a timeout-clear input;

a reset input;

an interval-pulse input; and a number of internal states, each transition by the state machine initiated by one of:
  reception of a reset signal via the reset input;
  reception of a timeout-clear signal via the timeout-clear input; and
  an interval pulse via the internal-pulse input.

17. The method of claim 13 wherein, upon receiving a reset signal via the reset input or a timeout-clear signal via the timeout-clear input, the state machine transitions to an idle state; and wherein, upon receiving an interval pulse via the internal-pulse input,
  when the state machine currently resides in a final intermediate state, the state machine transitions to a timeout state and outputs a timeout signal, and
  when the state machine currently resides in the idle state or an intermediate state other than the final intermediate state, the state machine transitions to a next intermediate state.

* * * * *